United States Patent
Chavez et al.

(10) Patent No.: US 6,591,102 B1
(45) Date of Patent: Jul. 8, 2003

(54) METHOD AND SYSTEM FOR TRANSMITTING FEATURE AND AUTHENTICATION INFORMATION FOR WIRELESS COMMUNICATION SERVICES

(75) Inventors: David L. Chavez, Thornton, CO (US); Larry J. Hardouin, Westminster, CO (US); Stephen M. Thieler, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/498,494

(22) Filed: Feb. 3, 2000

(51) Int. Cl.[7] ................................. H04Q 7/20
(52) U.S. Cl. ........................ 455/435; 455/410
(58) Field of Search ................... 455/410, 411, 455/432, 435, 433, 461; 380/247

(56) References Cited

U.S. PATENT DOCUMENTS 5,642,401 A * 6/1997 Yahagi ..................... 380/248
5,657,375 A * 8/1997 Connolly et al. ........... 455/436

* cited by examiner

*Primary Examiner*—Vivian Chin
*Assistant Examiner*—Tu X Nguyen
(74) *Attorney, Agent, or Firm*—Patton Boggs LLP

(57) ABSTRACT

The present method and system for transmitting feature and authentication information for wireless communication services reduces the amount of data transmitted from a handset to a base station by transmitting service information when the wireless handset registers with the base station and authentication information when wireless service is requested by the wireless handset. After receiving the service and authentication information, the base station may store the service and authentication information in memory and retrieve the stored service and authentication information when the wireless handset again requests service from the base station. Alternatively, a mobile switching system may communicate the service and authentication information to the base station.

51 Claims, 6 Drawing Sheets

METHOD AND SYSTEM FOR TRANSMITTING FEATURE AND AUTHENTICATION INFORMATION FOR WIRELESS COMMUNICATION SERVICES

FIELD OF THE INVENTION

This invention relates to providing wireless communications. More particularly, this invention relates to a system for transmitting service and authentication information in a manner that reduces transmissions over the system.

Problem

Wireless communications have proliferated in the last few years. For purposes of this application, wireless communications include telephone services, pagers, Internet service, e-mail, and other service provided to mobile handsets. FIG. 1 illustrates wireless network 100 providing wireless communications to a mobile handset 110. For purposes of the present discussion, mobile handset may be a cellular telephone, a pager, or any other type of device that exchanges signals with a wireless network to provide a service to a user.

Radio signals 120 are transmitted between mobile handset 110 and one of antennas 130. The antenna 130 transmits and receives radio signals 120 containing data for providing wireless services to handset 110. Antenna 130 transmits data to and receives data from a base station 140 via path 131. Base station 140 converts radios signals to signals to be transmitted over the telephone network. Each base station 140 is connected to a mobile switching system 150. Mobile switching system 150 controls which base station 140 provides service to mobile handset 110. Mobile switching system 150 also connects the base station 140 to public telephone switching network (PTSN) 160 via path 151. One skilled in the art will recognize that path 151 is a plurality of trunks that connects mobile switching system 150 to switching systems in PTSN 160.

Wireless communications are provided in the following manner. Mobile handsets enters a cell serviced by an antenna 130 and transmits a location registration request via radio signals 120 to the antenna 130. Antenna 130 passes the location registration request to the connected base station 140. The base station transmits a location registration request to mobile switching system 150 and transmits a signal to handset 110 to terminate the location registration request. Mobile switching system the forwards the request to service provider wireless server 170. Service provider wireless server 170 maintains records as to which services that mobile handset 110 receives.

Service provider wireless server 170 transmits a message to mobile switching system 150 that includes service information and authentication information to mobile switching system 150. Mobile switching system 150 in turn transmits the message to base station 140. Base station 140 uses the information to determine which services that mobile handset 110 receives and to authenticate the handset 110 when service is requested. Every time mobile handset 110 moves to a new cell, the above process is executed.

As the number of services and users of wireless communications increase, the size of each cell decreases and the number of cells increases. As the number of cells increases, the traffic over the wireless network increases. Therefore, there is a need in the art for a reduction in the amount of data transmitted over the network.

Solution

The above and other problems are solved and an advance in the art is made by the provision of a method and a system for transmitting feature and authentication information for wireless communication services. This invention reduces the amount of data transmitted over a wireless network when a mobile handset is registered in a cell. The amount of data is reduced by only transmitting the service information for a handset to a base station when the handset registers with a base station. Authentication information is only transmitted to the base station when a request for a wireless service is requested for the wireless handset. This reduces the amount of data transmitted over the wireless network since authentication data is only transmitted when service is requested.

In accordance with an exemplary embodiment of this invention, wireless communication services are provided to a mobile handset in the following manner. A base station receives a location registration request from the mobile handset. In response to receiving the location registration request, the base station transmits a service information request to a mobile switching system. The base station then receives an information message from the mobile switching system in response to the service information request transmitted by the base station. The information message includes the service information for the mobile handset. When the base station receives a communication service request for the mobile handset in said base station, the base station also receives authentication information from the mobile switching system. After the base station receives the authentication information, the base station performs an authentication of the mobile handset in response to receiving the authentication information.

When the base station receives a service set-up message requesting a service for a wireless handset, the base station reads authentication information from a service information message in response to receiving a request for an incoming service to the mobile handset. The base station may then stores the authentication information in response to reading the authentication information from the service information message.

When the base station receives a request from the mobile handset for an outgoing service, the base station may determine whether the authentication information for the mobile handset is stored in a memory in the base station. If the authentication information is stored in the memory, the base station reads the authentication information from the memory. If the authentication information is not stored in the memory, the base station transmits a request to the mobile switching system for the authentication information. The base station then receives the authentication information from the mobile switching system. The authentication information may then be stored in the memory in response to receiving the authentication information.

The mobile switching system may perform in the following manner in an exemplary embodiment. First, the mobile switching system receives the service information request from the base station. The mobile switching system then generates an information message that includes the service information for the mobile handset. The information message is then transmitted by the mobile switching to the base station.

In order to generate the information message, the mobile switching system may determine whether the service information for the mobile handset is stored in a memory in the mobile switching system. If the service information is stored in the memory of the mobile switching system, the mobile switching system reads the service information from the memory.

If the service information is not stored in the memory of the mobile switching system, the mobile switching systems transmits a request for the service information to a service provider server. The service provider server transmits the service information to the mobile switching system. The mobile switching system receives the service information. After the service information is received, the mobile switching system may store the service information in the memory.

When the mobile switching system receives an authentication information request from the base station, the mobile switching system generates an authentication message including the authentication information and transmits the authentication message to the base station. In order to generate the authentication message, the mobile switching system may determine whether the authentication information is stored in a memory of the mobile switching system in response to receiving an authentication information request. If the authentication information is stored in the memory, the mobile switching system reads the authentication information from the memory.

If the authentication information is not stored in the memory, the mobile switching system transmits a request for the authentication information to a service provider server. The mobile switching system then receives the authentication information from the service provider service in response to a transmission of the request for the service information. When the mobile switching system receives the authentication information, the mobile switching system may store the authentication information in the memory of the mobile switching system for future use.

DESCRIPTION OF THE DRAWINGS

The above and other described and other features of this invention may be understood for the Detailed Description and the following drawings.

DETAILED DESCRIPTION

Figure 1:
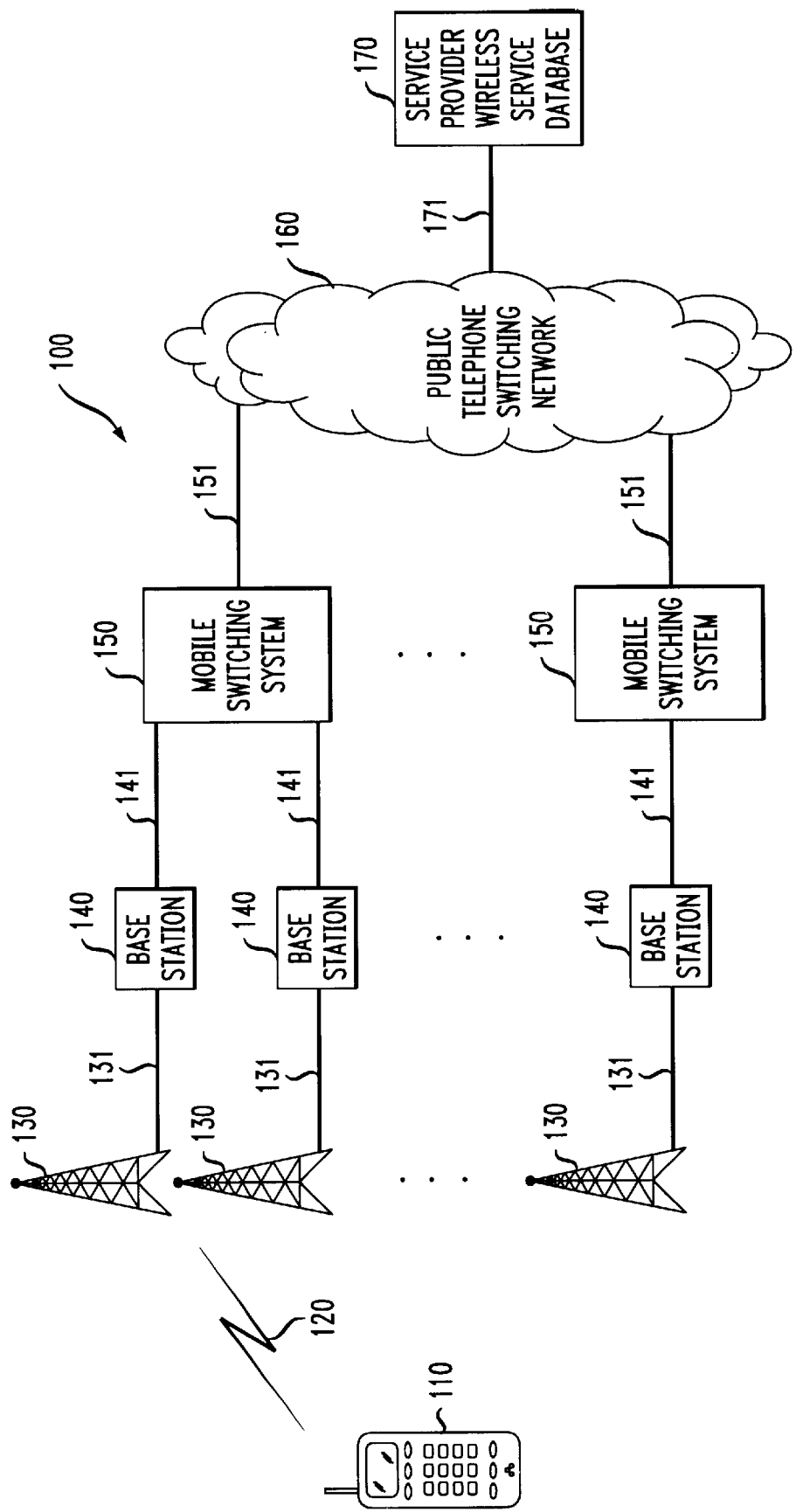
FIG. 1 illustrating components of a wireless network.

FIG. 1 illustrates a conventional wireless network 100 that performs the exemplary processes of this invention to reduce the amount of data transmitted over the wireless network 100. Wireless network 100 provides wireless communications to a mobile handset 110. For purposes of the present discussion, mobile handset 110 is a device that communicates with wireless network 100. Examples of mobile handset 110 include but are not limited to a cellular telephone, a pager, or any other type of device that exchanges signals with a wireless network to provide a service to a user.

Radio signals 120 are transmitted between mobile handset 110 and one of antennas 130. The antenna 130 transmits and receives radio signals 120 containing data for providing wireless services to handset 110. Antenna 130 transmits data to and receives data from a base station 140 via path 131. Base station 140 converts radios signals to signals to be transmitted over the telephone network. Each base station 140 is connected to a mobile switching system 150. Mobile switching system 150 controls which base station 140 provides service to mobile handset 110. Mobile switching system 150 also connects the base station 140 to public telephone switching network (PTSN) 160 via path 151. One skilled in the art will recognize that path 151 is a plurality of trunks that connects mobile switching system 150 to switching systems in PTSN 160.

Figure 2:
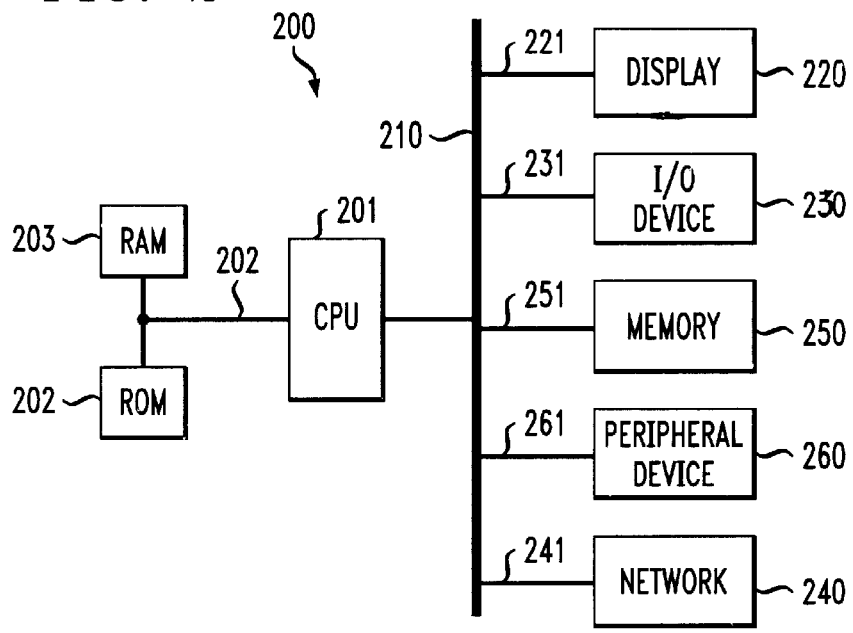
FIG. 2 illustrating an exemplary processing unit.

In order to provide wireless service each mobile switching system 150 and base station 140 must have a processing unit. The processing unit is a device the performs instructions stored in a memory to perform an application. Applications are processes executed to control a device or provide a service. FIG. 2 illustrates an exemplary processing device that controls a switching system 150 or base station 140.

Processing system 200 has a central processing unit (CPU) 201 which executes instructions read from a memory to perform applications that comprise the operations of processing system 200. CPU 201 is connected to a memory bus 202. Memory bus 202 allows CPU 201 to access Read Only Memory (ROM) 202 and Random Access Memory 203. ROM 202 is a memory that stores instructions for performing the basic operative tasks of processing system 200. RAM 203 is a memory that stores the instructions and data needed to execute applications that are performed by processing system 200.

I/O bus 210 connects CPU 201 to a plurality of peripheral devices. CPU 201 receives and transmits data to the peripheral devices via I/O bus 210. The peripheral devices connected to I/O bus 210 include, but are not limited to, display 220, input device 230, network interface 240, and non-volatile memory 250. Display 220 is connected to I/O bus 210 by path 221 and includes a video driver and connected monitor for displaying information to a user. Input device 230 is connected to I/O bus 210 via path 231 and is a keyboard and/or mouse attached to an appropriate driver for receiving input data from a user. Network interface 240 is connected to I/O bus 210 via path 241 and is a modem or Ethernet device driver that allows processing system 200 to communicate with a second processing system. Non-volatile memory 250 is a device, such as a disk drive, connected to I/O bus 210 via path 251 and which can read and write data to a disk or other storage media to store the data for future use.

Figure 3:
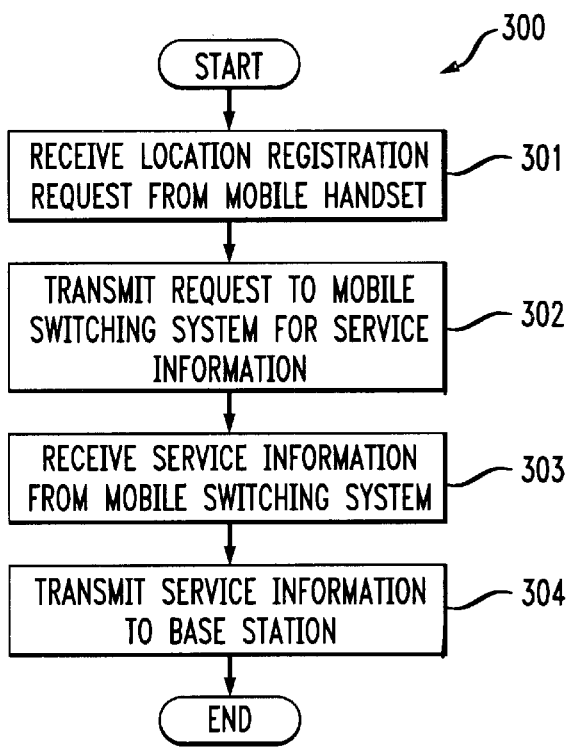
FIG. 3 illustrating an exemplary process for receiving service and authentication information in a base station in accordance with this invention.

FIG. 3 illustrates an exemplary embodiment of a process 300 for receiving service and authentication information in a base station. In the prior art, the base station 140 must request service information and authentication information when a mobile handset 110 registers for service in a cell service by the base station 140. In accordance with this invention, the base station receives the service information for a mobile handset 110 when the mobile handset requests service from a base station 140.

Process 300 begins when a base station 140 receives a location registration request from mobile handset 110 in step 301. A location registration request is a signal requesting that a base station 140 provide wireless service to mobile handset 110 because mobile handset 110 is the cell served by base station 140. In response to receiving the location registration request from mobile handset 110, base station 140 transmits a service information request to mobile switching system 150 serving base station 140 in step 302. An information message containing the service information is received by the base station 140 in step 303. The information message is transmitted by mobile switching system 301 in response to the service information request. This reduces the length of the transmitted message as the authentication information is not transmitted at the time service is requested. In step 304, the base station 140 receives a communications service information for mobile handset 110 and process 300 ends.

Figure 4:
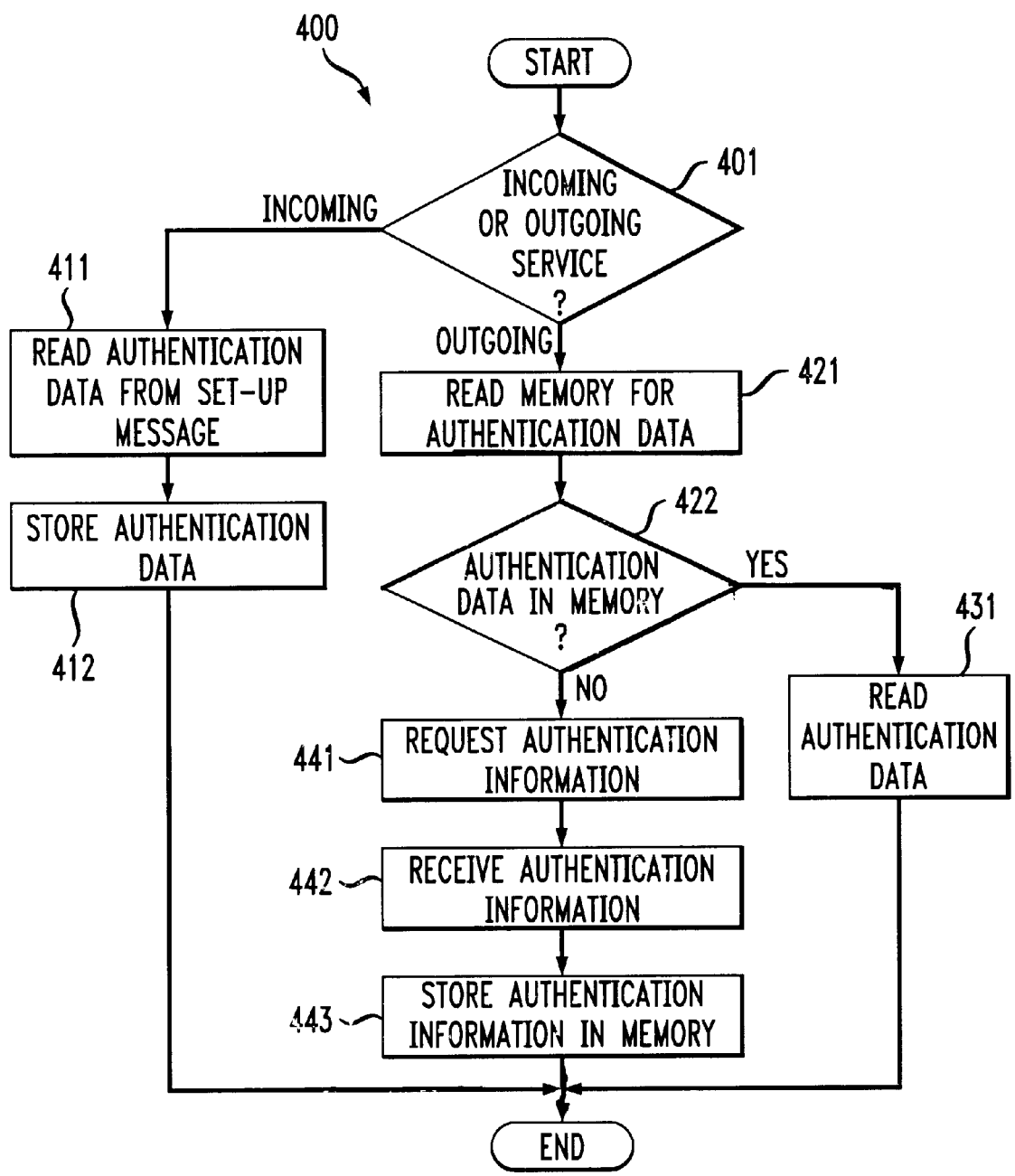
FIG. 4 illustrating an exemplary process for receiving authentication information for a mobile handset when a wireless service is requested for the mobile handset.

Process 400, illustrated in FIG. 4, is the process executed by a base station 140 to receive incoming or outgoing service for a handset 110. First, base station 140 determines whether the request is for an incoming service request or an outgoing service request. An incoming service request is a service request received from mobile switching system 150 to provide a communication service to mobile handset 110. An example of an incoming service request is a call set-up message received from switching system 150. An outgoing service request is a request received from mobile handset 110 for a communications service. An example of an outgoing service request is receiving a message including a telephone number requesting a call. An incoming service request may be indicated by receiving a call set-up message or an equivalent message. An outgoing message is indicated by receiving dial digits or an equivalent message.

If the request is an incoming service request, base station 140 reads authentication information from the incoming service request in step 411. For example, the authentication information may be in a call set-up message. The authentication information may then be stored in a memory in base station 140 for future use in step 412 and normal authentication is performed. If the authentication is successful, service is provided to handset 110. If the authentication is not successful, service is not provided to handset 110.

If the request is an outgoing service request, base station 140 reads a memory storing authentication information for mobile handsets serviced by the base station 140 in step 421. In step 422, the base station 140 determines whether the authentication information is stored in the memory. If the authentication information is stored in the memory, base station 140 reads the authentication information from the memory in step 431 and normal authentication is performed. If the authentication is successful, service is provided to handset 110. If the authentication is not successful, service is not provided to handset 110.

If the authentication information is not stored in the memory, base station 140 transmits a request for the authentication information for mobile handset 100 to mobile switching system 150 in step 441. This request may be part of a call-set up message or other type of message used to establish a communication service for mobile handset 110 that must be transmitted by base station 140. In response to the request, base station 140 receives the authentication information for the mobile handset 110 in step 442. The authentication information is then stored in the memory for future use in step 443 and normal authentication is performed. If the authentication is successful, service is provided to handset 110. If the authentication is not successful, service is not provided to handset 110.

The following processes are the processes executed by mobile switching systems 150 in accordance with an exemplary embodiment. Process 500 illustrated in FIG. 5 is the process executed by switching system 150 to provide service information to a base station 140 and process 600 illustrated in FIG. 6 is the process executed by switching system 150 to provide authentication information to base station 140 when a request for a communication service is made.

Figure 5:
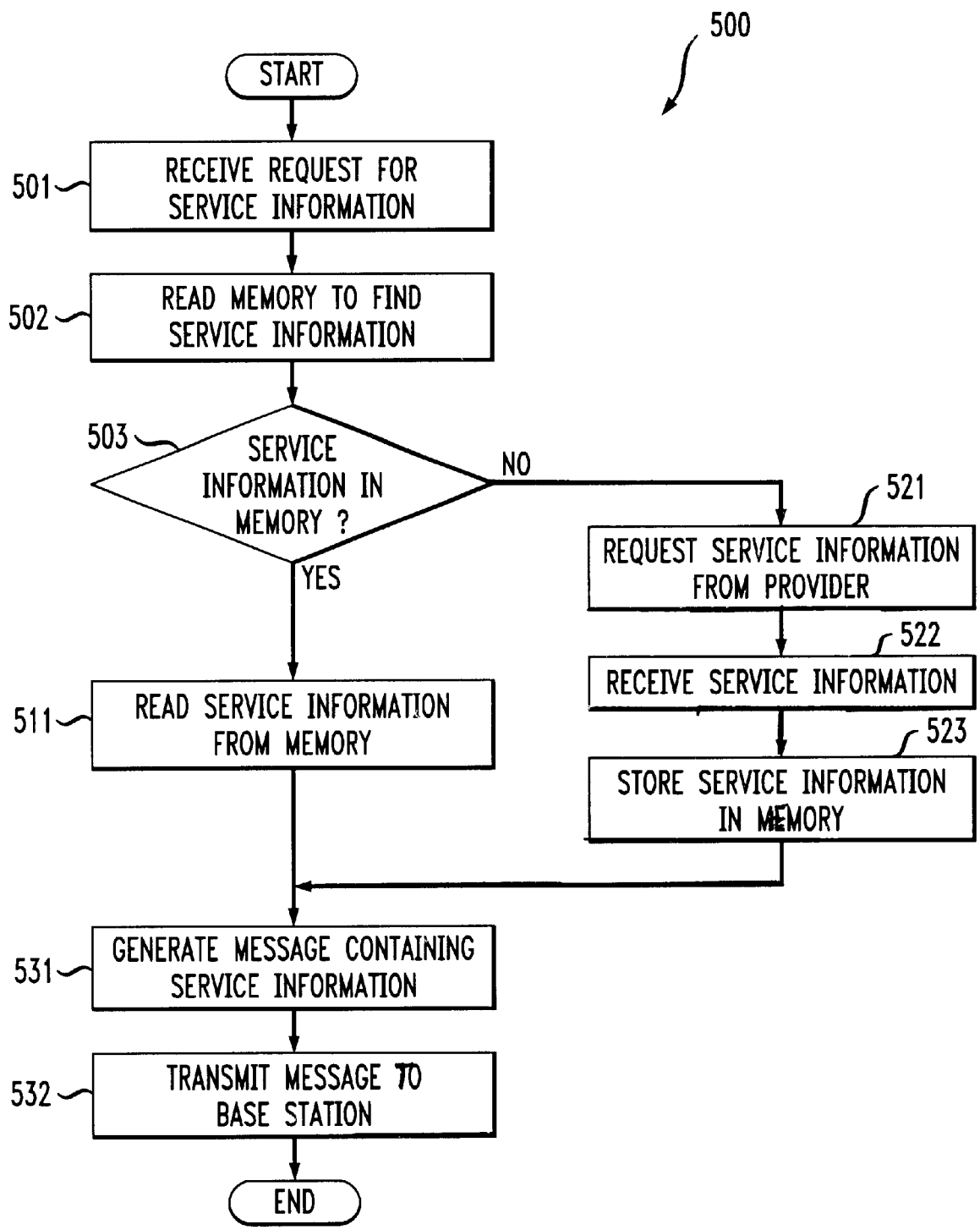
FIG. 5 illustrating an exemplary process performed by an mobile system to provide service information for a mobile handset to a base station.
Figure 6:
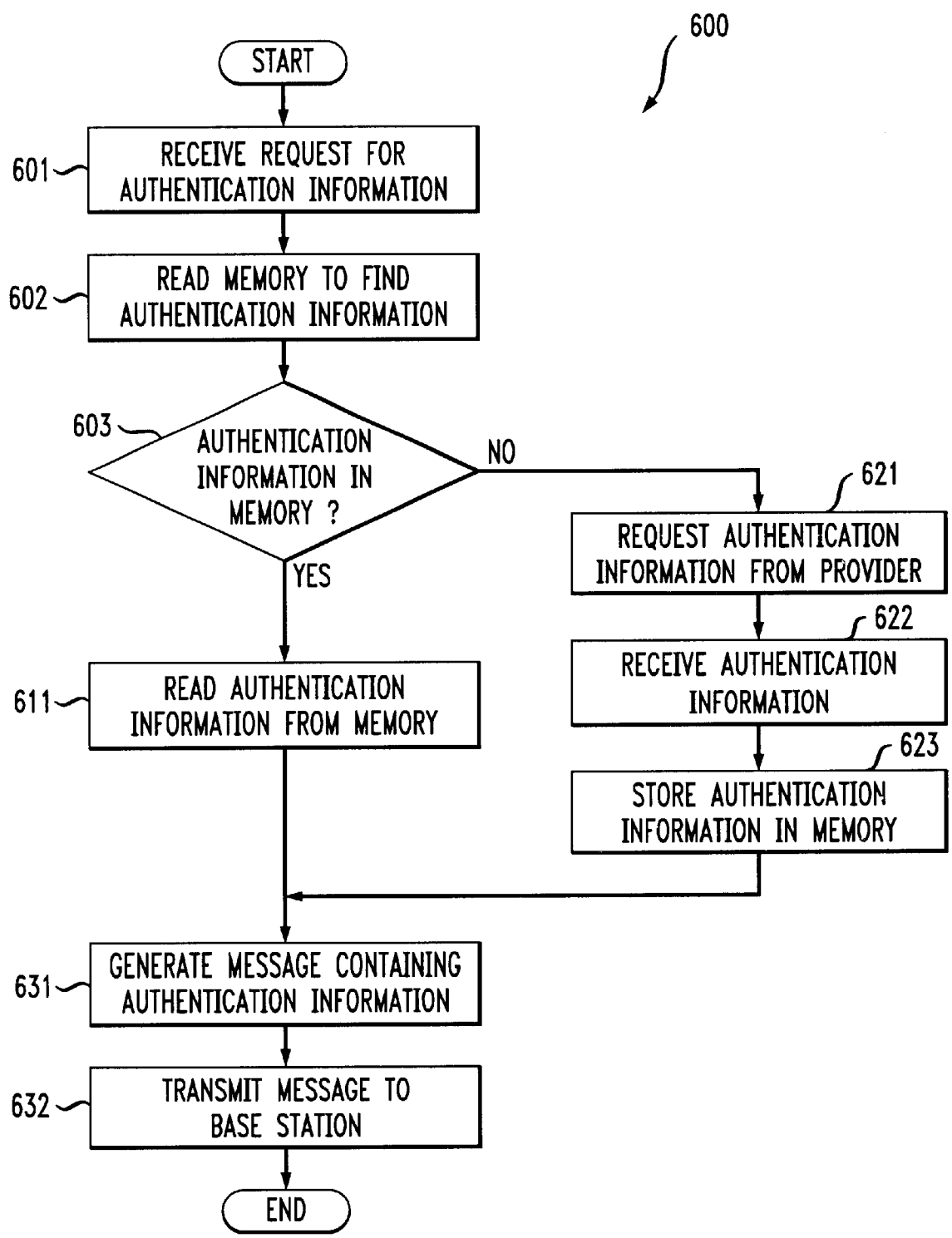
FIG. 6 illustrating an exemplary process performed by a mobile switching system to provide authentication information for a mobile handset to a base station.

Process 500, illustrated in FIG. 5, is a process for providing service information for a mobile handset 110 to a base station 140 when the mobile handset begins to receive service from the base station 140. Process 500 begins with step 501 in which mobile switching system 150 receives a request for service information. The request is typically in the form of a location registration request message from a base station 140 when mobile handset 110 request location registration. The location registration can be a request to start service or for roaming from another cell.

In step 502, mobile switching system 150 reads a memory in the mobile switching system 150 to determine whether the service information for the mobile handset 110 is stored in the memory. Mobile switching system 150 determines whether the service information is in the memory in step 503. If the service information is stored in the memory, mobile switching system 150 reads the service information from the memory in step 511 and processing continues to step 531.

If the service information is not stored in the memory from a previous request for the service information, mobile switching system 150 requests the service information from a service provider server 170. One skilled in the art will recognize that there may be more than one service provider server 170 connected to a network. The service provider server then transmits messages containing the service information bask to the mobile switching system 150. The mobile switching system 150 receives the messages containing the service information in step 522 and may store the service information in a memory in mobile switching system 150 in response to receiving the service information. Process 500 then continues in step 531.

In step 531, message that include the service information are generated by the mobile switching system. The message are then transmitted to the base station 140 requesting the service information in step 532. Process 500 then ends.

Process 600, illustrated in FIG. 6 is the process performed by mobile switching system 150 to provide authentication information for a mobile handset 110 to a base station 140 in response to a request for such information received in a call set-up message from base station 140 or when a request from an incoming service to a mobile handset is generated and transmitted to the base station 140. Process 600 begins in step 601 when a request for authentication information is received. In this embodiment, this may be when a call set-up message is received for a mobile handset 110 that is service by a base station 140 connected to mobile switching system 150 or when base station 140 transmits a message for a service that originates from mobile handset 110. One skilled in the art will recognize that may other variations may be a request for authentication information.

In step 602, mobile switching system 150 reads a memory in the mobile switching system 150 to determine whether the authentication information for the mobile handset 110 is stored in the memory. Mobile switching system 150 determines whether the authentication information is in the memory in step 603. If the authentication information is stored in the memory, mobile switching system 150 reads the authentication information from the memory in step 611 and processing continues to step 631.

If the authentication information of the mobile handset 110 is not stored in the memory from a previous request for the authentication information, mobile switching system 150 requests the authentication information from a service provider server 170 in step 621. One skilled in the art will recognize that there may be more than one service provider server 170 connected to a network. The service provider server then transmits messages containing the authentication information back to the mobile switching system 150. The mobile switching system 150 receives the messages containing the authentication information in step 622 and may store the authentication information in a memory in mobile switching system 150 in response to receiving the service information in step 623. Process 600 then continues in step 631.

In step 631, messages that include the authentication information are generated by the mobile switching system 150. The messages are then transmitted to the base station 140 requesting the authentication information in step 632. Process 600 then ends.

Figure 7:
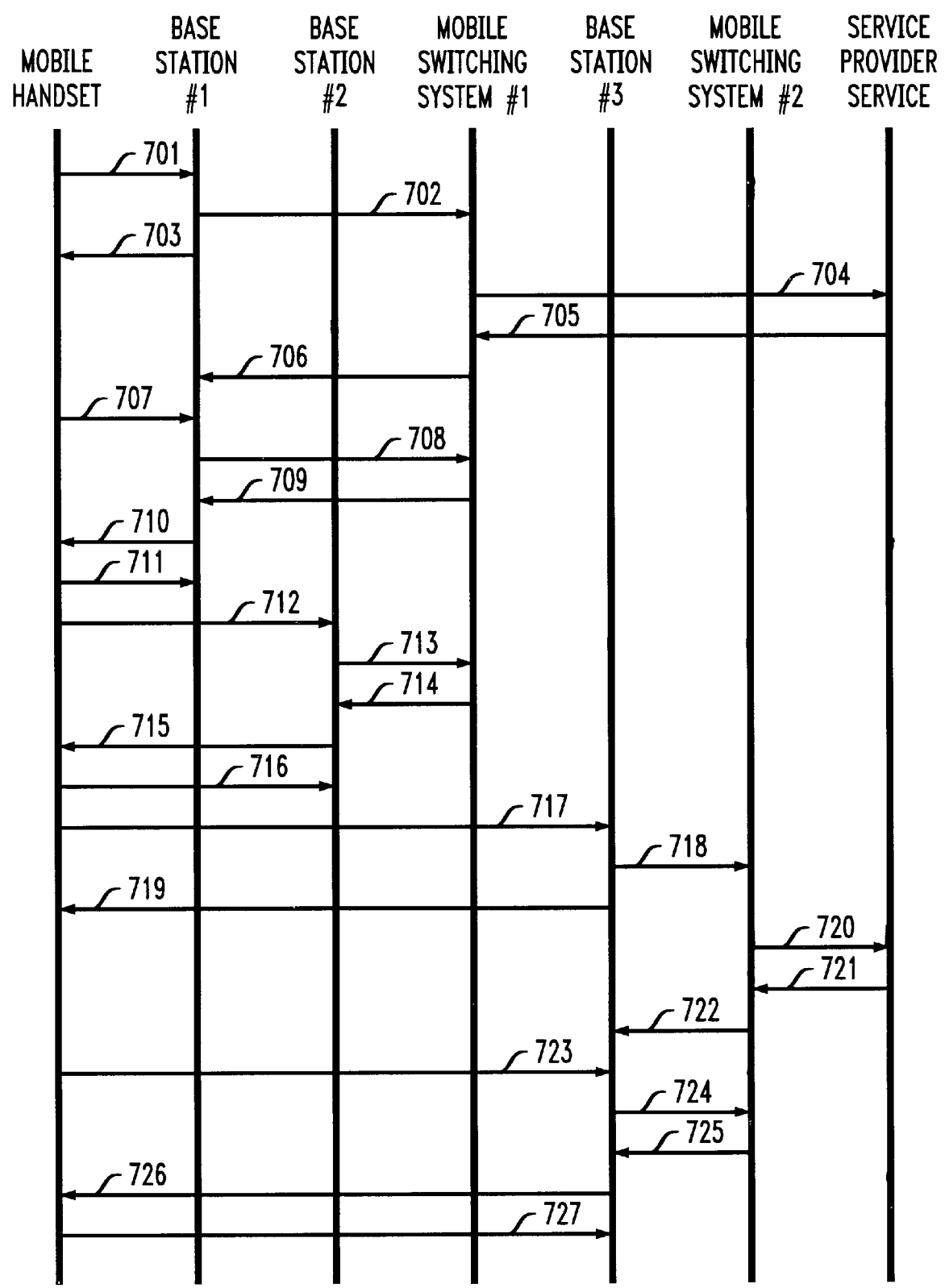
FIG. 7 illustrating an exemplary signaling chart for a wireless network performing the exemplary processes of this invention.

FIG. 7 illustrates a signaling chart of wireless network 100 showing the initialization of mobile handset 110 onto wireless network 100 and the hand-off a wireless handset 110 between multiple base stations 140 in a preferred exemplary embodiment. When a user powers up wireless handset 110 or enters a cell served by a first antenna 130 connected to a first base station 140, wireless handset 110 transmits a location registration signal 701. In response to location registration signal 701, first base station 140 transmits a registration message 702 which is a request to register mobile handset at the first base station 140 and a request for service information for mobile handset 110. At this time, a termination signal 703 that terminates the registration request is transmitted from first base station 140 to mobile handset 110. This termination signal identifies the first base station as the base station providing service to handset 110.

First mobile switching system 150A receives registration message 702 and determines whether the service information for mobile handset 110 is stored in a memory in first mobile switching system 150. Since this is a first appearance of mobile handset 110 in network 100, the memory in first mobile switching system 150 does not store the service information for mobile handset 110. Therefore, a service information message 704 requesting the service information is transmitted to service provider server 170 requesting information for mobile handset 110. When the service information message 704 is received, service provider server 170 generates and transmits messages 705 that contain service information. One skilled in the art will recognize that messages 705 may also include authentication information at this time. When first mobile switching system 150A receives messages 705, the service information for handset 110 is stored in a memory. Service information messages 706 containing are then transmitted to first base station 140.

At a later time, mobile handset 110 transmits a communication service request message 707 to first base station 140A. An example of a communication service request message 707 is transmitting a message containing dialed digits to first base station 140A. In response to receiving communication service request message 705, first base station 140A determines whether authentication information is stored in first base station 140A. In this example, first base station 140A does not have the authentication information. Therefore, first base station 140A transmits authentication request in message 708 to first mobile switching system 150A. Message 708 may be a pre-existing message in a protocol such as a call set-up message.

In response to the authentication request in message 708, first mobile switching system 150A may have to request the authentication information for a mobile handset 110 from service provider server 170. However, in this embodiment, the authentication information was transmitted with the service information. Thus, first mobile switching system 150A generates and transmits an authentication message 709 including the authentication information for mobile handset 110.

First base station 140A receives the authentication information in message 709 and may now perform an authentication of mobile handset 110. In order to perform an authentication, first base station 140A transmits an authentication request message 710 to mobile handset 110 requesting authentication data. Mobile handset 110 transmits message the authentication data needed to perform authentication in message 711. If the authentication process is completed successfully, the communication service is provided by giving the requested service from mobile switching system 150A.

At this time mobile handset 110 moves into a cell serviced by second base station 140. A location registration request message 712 is transmitted from mobile handset 110 to second base station 140B. In order to continue providing the communication service to handset 110, second base station 140B transmits a request message 713 for service information and authentication information to first mobile switching system 150A. The first mobile switching system has the service and authentication information stored in the memory and transmits the service and authentication information in an information message 714 to second base station 140B.

Second base station 140B receives the authentication information in message 714 and may now perform an authentication of mobile handset 110. If some service is to be provided to handset 110 at that time, then authentication of handset 110 should be accomplished. In order to perform an authentication, first base station 140B transmits an authentication request message 715 to mobile handset 110 requesting authentication data. Mobile handset 110 transmits message the authentication data needed to perform authentication in message 716. If the authentication process is completed successfully, the communication service is provided to mobile handset 110 by second base station 140B. The communication service is later terminated while mobile handset 110 is in the cell service by second base station 140.

After a certain time, mobile handset 110 moves from the cell served by second base station 140B into the cell served by third base station 140C. When mobile handset moves into the new cell, a location registration message 717 is transmitted by mobile handset 110 to third base station 140C. Third base station 140C transmits a registration message 718 requesting service information to second mobile switching system 150B and transmits a registration termination message 719 to mobile handset 110.

Second mobile switching system 150B receives registration message 718 and determines whether the service information for mobile handset 110 is stored in a memory in second mobile switching system 150B. Since this is a first appearance of mobile handset 110 on a base station connected to second mobile switching system 150B, the memory in second mobile switching system 150B does not store the service information for mobile handset 110. Therefore, a service information message 720 requesting the service information is transmitted to service provider server 170 requesting information for mobile handset 110. When the service information message 720 is received, service provider server 170 generates and transmits messages 721 that contain service information. One skilled in the art will recognize that messages 721 may also include authentication information at this time. When second mobile switching system 150B receives messages 721, the service information for handset 110 is stored in a memory. Service information messages 722 containing the service information are then transmitted to second base station 140.

At a later time, mobile handset 110 transmits a communication service request message 723 to second base station 140B. An example of a communication service request message 723 is transmitting a message containing dialed digits to second base station 140B. In response to receiving communication service request message 723, second base station 140B determines whether authentication information is stored in second base station 140B. In this example, second base station 140B does not have the authentication information. Therefore, second base station 140B transmits authentication request in message 724 to second mobile switching system 150B. Message 724 may be a pre-existing message in a protocol such as a call set-up message.

In response to the authentication request in message 724, second mobile switching system 150B may have to request the authentication information for a mobile handset 110 from service provider server 170. However, in this embodiment, the authentication information was transmitted with the service information. Thus, second mobile switching system 150B generates and transmits an authentication message 725 including the authentication information for mobile handset 110.

Second base station 140B receives the authentication information in message 725 and may now perform an authentication of mobile handset 110. In order to perform an authentication, second base station 140B transmits an authentication request message 726 to mobile handset 110 requesting authentication data. Mobile handset 110 transmits message 727 the authentication data needed to perform authentication. If the authentication process is completed successfully, the communication service is provided by mobile switching system 150B.

The above example reduces the traffic over network 100 since each base station is not requesting the entire information until the information is needed at the time a service is requested. If the service is not requested the information is not transmitted over the network 100.

The above is description of an system and processes that reduces the amount of information transmitted over the network. It is expected that one skilled in the can and will design alternative networks and processes that infringe this invention as set forth in the claims below either literally or through the Doctrine of Equivalents.

What is claimed is:

1. A method for providing communication services to a mobile handset comprising the steps of:
   receiving a location registration request from handset in a base station;
   transmitting a service information request from said base station to a mobile switching system;
   receiving a information message from said mobile switching system in said base station in response to said service information request transmitted by said base station wherein said information message includes said service information for said handset;
   receiving a communication service request for said mobile handset in said base station;
   receiving authentication information from said mobile switching system to said base station in response to receiving said communication service request, comprising:
   determining whether said authentication information for said mobile handset is stored in a memory in said base station in response to said mobile handset transmitting a outgoing communication service request,
   transmitting a request to said mobile switching system for said authentication information in response to a determination that said authentication information is not stored in said memory, and
   receiving said authentication information from said mobile switching system in said base station in response to transmitting said request.

2. The method of claim 1 further comprising the step of:
   performing an authentication of said mobile handset in response to receiving said authentication information.

3. The method of claim 1 wherein said step of receiving said authentication information comprises the step of:
   reading authentication information from a service information message in response to receiving a request for an incoming service to said mobile handset.

4. The method of claim 3 wherein said step of receiving said authentication information further comprises the step of:
   storing said authentication information in response to reading said authentication information from said service information message.

5. The method of claim 1 wherein said step of receiving said authentication information further comprises the step of:
   reading said authentication information from said memory in response to a determination that said authentication information is stored in said memory.

6. The method of claim 1 wherein said step of receiving said authentication information further comprises the step of:
   storing said authentication information in said memory in response to receiving said authentication information.

7. The method of claim 1 further comprising the steps of:
   receiving said service information request in said mobile switching system;
   generating said information message including said service information in said mobile switching system; and
   transmitting said information message from said mobile switching system to said base station.

8. The method of claim 7 further comprising the step of:
   determining whether said service information is stored in a memory in said mobile switching system.

9. The method of claim 8 further comprising the step of:
   reading said service information from said memory in response to a determination that said service information is stored in said memory.

10. The method of claim 8 further comprising the steps of:
    transmitting a request for said service information from said mobile switching system to a service provider server in response to a determination that said service information is not stored in said memory; and
    receiving said service information from said service provider server in mobile switching system in response to a transmission of said request for said service information.

11. The method of claim 10 further comprising the step of:
    storing said service information in said memory in response to receiving said service information from said service provider server.

12. The method of claim 1 further comprising the steps of:
    receiving said authentication information request for said mobile handset in said mobile switching system;

generating an authentication message including said authentication information in said mobile switching system; and transmitting said authentication message from said mobile switching system to said base station.

13. The method of claim 12 further comprising the step of:

determining whether said authentication information is stored in a memory in said mobile switching system in response to receiving said authentication information request.

14. The method of claim 13 further comprising the step of:

reading said authentication information from said memory in response to a determination that said authentication information is stored in said memory.

15. The method of claim 13 further comprising the steps of:

transmitting a request for said authentication information from said mobile switching system to a service provider server in response to a determination that said authentication information is not stored in said memory; and receiving said authentication information from said service provider service in mobile switching system in response to a transmission of said request for said service information.

16. The method of claim 15 further comprising the step of:

storing said authentication information in said memory in response to receiving said service information from said service provider server.

17. The method of claim 1 further comprising the step of:

terminating a location registration in said base station.

18. An apparatus for providing communication services to a mobile handset comprising:

means for receiving a location registration request from handset in a base station;

means responsive to a reception of said location registration request for transmitting a service information request from said base station to a mobile switching system;

means responsive to a transmission of said service information request from said base station for receiving a information message from said mobile switching system in said base station wherein said information message includes said service information for said handset;

means for receiving a communication service request for said mobile handset in said base station;

means responsive to a reception of said communication service request for receiving authentication information from said mobile switching system to said base station, comprising:

means responsive to said mobile handset transmitting an outgoing communication service request for determining whether said authentication information for said mobile handset is stored in a memory in said base station, means responsive to a determination that said authentication information is not stored in said memory for transmitting a request to said mobile switching system for said authentication information, and means in said base station for receiving said authentication information from said mobile switching system in said base station in response to transmitting said request.

19. The apparatus of claim 18 further comprising:

means responsive to a reception of said authentication information for performing an authentication of said mobile handset.

20. The apparatus of claim 18 wherein said means for receiving said authentication information comprises:

means responsive to reception of a request an incoming communication service for reading authentication information from a service information message.

21. The apparatus of claim 20 wherein said means of receiving said authentication information further comprises:

means responsive to a reading of said authentication information from said information message for storing said authentication information in said memory of said base station.

22. The apparatus of claim 18 wherein said means for receiving said authentication information further comprises:

means responsive to a determination that said authentication information is stored in said memory for reading said authentication information from said memory.

23. The apparatus of claim 18 wherein said means for receiving said authentication information further comprises:

means responsive to receiving said authentication information for storing said authentication information in said memory.

24. The apparatus of claim 18 further comprising:

means for receiving said service information request in said mobile switching system;

means for generating said information message including said service information in said mobile switching system; and means responsive to a generation of said information message for transmitting said information message from said mobile switching system to said base station.

25. The apparatus of claim 24 further comprising:

means for determining whether said service information is stored in a memory in said mobile switching system.

26. The apparatus of claim 25 further comprising:

means responsive to a determination that said service information is stored in said memory for reading said service information from said memory in response.

27. The apparatus of claim 25 further comprising:

mean responsive to a determination that said service information is not stored in said memory for transmitting a request for said service information from said mobile switching system to a service provider server; and means responsive to a transmission of said request for said service information for receiving said service information from said service provider service in mobile switching system in response.

28. The apparatus of claim 27 further comprising:

means responsive to receiving said service information from said service provider server for storing said service information in said memory.

29. The apparatus of claim 18 further comprising:

means for receiving said authentication information request for said mobile handset in said mobile switching system;

means for generating an authentication message including said authentication information in said mobile switching system; and means responsive to a generation of said authentication information got transmitting said authentication message from said mobile switching system to said base station.

30. The apparatus of claim 29 further comprising:
means responsive to receiving said authentication information request for determining whether said authentication information is stored in a memory in said mobile switching system.

31. The apparatus of claim 30 further comprising:
means responsive to a determination that said authentication information is stored in said memory for reading said authentication information from said memory.

32. The apparatus of claim 31 further comprising:
means responsive to a determination that said authentication information is not stored in said memory for transmitting a request for said authentication information from said mobile switching system to a service provider server; and
means responsive to a transmission of said request for said service information for receiving said authentication information from said service provider service in mobile switching system.

33. The apparatus of claim 32 further comprising:
means responsive to receiving said service information from said service provider server for storing said authentication information in said memory.

34. The apparatus of claim 18 further comprising:
means for terminating said location registration request in said base station.

35. A system for providing communication services to a mobile handset comprising:
a base station;
a processing unit in said base station;
instructions for directing said processing unit in said base station to;
receive a location registration request from said mobile handset;
transmit a service information request to a mobile switching system;
receive an information message from said mobile switching system in response to said service information request wherein said information message includes said service information for said handset;
receive a communication service request for said mobile handset; and
receive authentication information from said mobile switching system to said base station in response to receiving said communication service request;
transmit a request to said mobile switching system for said authentication information in response to a determination that said authentication information is not stored in said memory,
receive said authentication information from said mobile switching system in response to transmitting said request,
determine whether said authentication information for said mobile handset is stored in a memory in said base station in response to said mobile handset transmitting a outgoing communication service request, and
a media readable by said processing unit in said base station for storing said instructions.

36. The system of claim 35 wherein said instruction for directing said processing unit in said base station further comprise:
instructions for directing said processing unit in said base station to perform an authentication of said mobile handset in response to receiving said authentication information.

37. The system of claim 35 wherein said instructions to receive said authentication information comprises:
instructions for directing said processing in said base station to read authentication information from a service information message in response to receiving a request for an incoming service to said mobile handset.

38. The system of claim 37 wherein said instructions to receive said authentication information further comprise:
instructions for directing said processing unit in said base station to store said authentication information in response to reading said authentication information from said service information message.

39. The system of claim 35 wherein said instructions for directing said processing unit in said base station to receive said authentication information further comprises:
instructions for directing said processing unit in said base station to read said authentication information from said memory in response to a determination that said authentication information is stored in said memory.

40. The system of claim 35 wherein said instructions for directing said processing unit in said base station to receive said authentication information comprises:
instructions for directing said processing unit in said base station to store said authentication information in said memory in response to receiving said authentication information.

41. The system of claim 35 further comprising:
a processing unit in said mobile switching system;
instructions for directing said processing unit in said mobile switching system to:
receive said service information request;
generate said information message including said service information; and
transmit said information message to said base station; and
a media readable by said processing unit in said mobile switching system for storing said instructions.

42. The system of claim 41 wherein said instructions for directing said processing unit in said mobile switching system further comprise:
instructions for directing said processing unit in said mobile switching system to determine whether said service information is stored in a memory in said mobile switching system.

43. The system of claim 42 wherein said instructions for directing said processing unit in said mobile switching system further comprise:
instructions for directing said processing unit in said mobile switching system to read said service information from said memory in response to a determination that said service information is stored in said memory.

44. The system of claim 42 wherein said instructions for directing said processing unit in said mobile switching system further comprise:
instructions for directing said processing unit in said mobile switching system to:
transmit a request for said service information to a service provider server in response to a determination that said service information is not stored in said memory; and
receive said service information from said service provider service in mobile switching system in response to a transmission of said request for said service information.

45. The system of claim 44 wherein said instructions for directing said processing unit in said mobile switching system further comprise:

instructions for directing said processing unit in said mobile switching system to store said service information in said memory in response to receiving said service information from said service provider server.

46. The system of claim 35 wherein said instructions for directing said processing unit in said mobile switching system further comprise:

instructions for directing said processing unit in said mobile switching system to:
receive said authentication information request for said mobile handset;
generate an authentication message including said authentication information; and
transmit said authentication message to said base station.

47. The system of claim 46 wherein said instructions for directing said processing unit in said mobile switching system further comprise:

instructions for directing said processing unit in said mobile switching system to determine whether said authentication information is stored in a memory in said mobile switching system in response to receiving said authentication information request.

48. The system of claim 47 wherein said instructions for directing said processing unit in said mobile switching system further comprise:

instructions for directing said processing unit in said mobile switching system to read said authentication information from said memory in response to a determination that said authentication information is stored in said memory.

49. The method of claim 47 wherein said instructions for directing said processing unit in said mobile switching system further comprise:

instructions for directing said processing unit in said mobile switching system to:
transmit a request for said authentication information from said mobile switching system to a service provider server in response to a determination that said authentication information is not stored in said memory; and
receive said authentication information from said service provider service in mobile switching system in response to a transmission of said request for said service information.

50. The system of claim 49 wherein said instructions for directing said processing unit in said mobile switching system further comprise:

instructions for directing said processing unit in said mobile switching system to store said authentication information in said memory in response to receiving said service information from said service provider server.

51. The system of claim 35 wherein said instructions for directing said processing unit in said base station further comprise:

instructions for directing said processing unit in said base station to terminate a location registration in said base station.

* * * * *